May 14, 1946. G. A. TINNERMAN 2,400,142
FASTENING DEVICE
Filed March 17, 1944
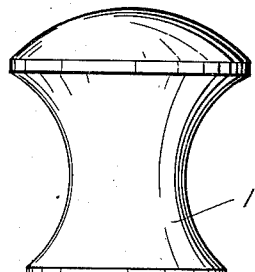
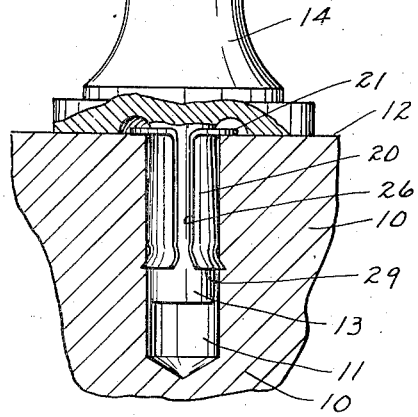
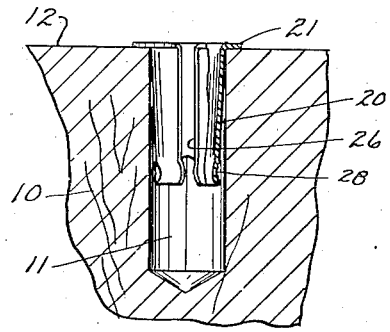
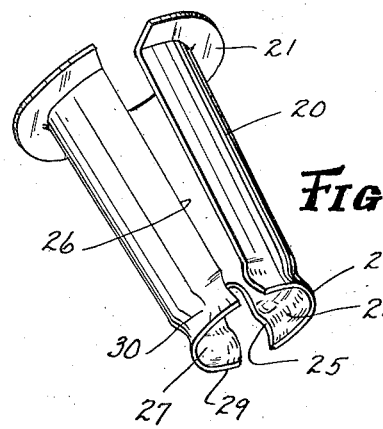
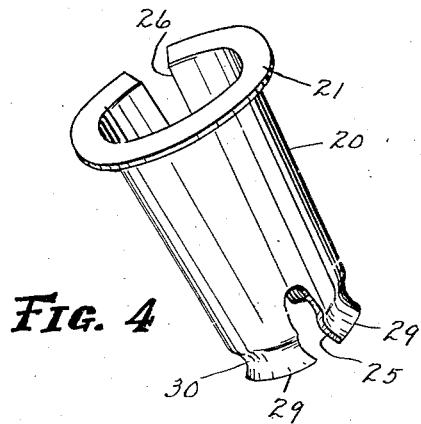
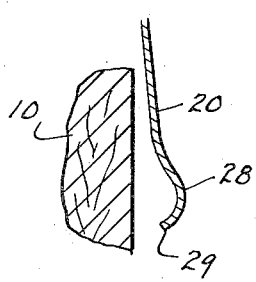
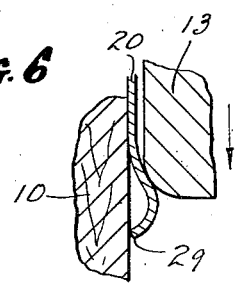
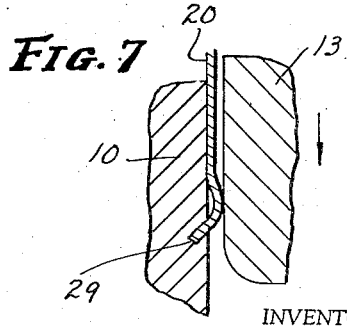
INVENTOR.
GEORGE A. TINNERMAN
BY
Bates, Teare, & McKean
ATTORNEYS Patented May 14, 1946

2,400,142

UNITED STATES PATENT OFFICE 2,400,142

FASTENING DEVICE

George A. Tinnerman, Cleveland, Ohio, assignor to Tinnerman Products, Inc., Cleveland, Ohio, a corporation of Ohio Application March 17, 1944, Serial No. 526,905

1 Claim. (Cl. 85—2.4)

This invention relates to fastening devices and particularly to those which are made of sheet metal and which are adapted to be used in connection with a stud for fastening articles such as drawer and door knobs, nameplates, medallions and trim.

There is considerable need for a sheet metal fastener which will operate to hold securely a door knob or other device which has a stud projecting therefrom, without the need for screws, bolts, rivets, or other fastening means, and especially in such installations where it is not feasible to employ a hole which extends entirely through the article to which the knob is to be applied. The problem has been to obtain a fastener which would not only be quickly assembled, but which would exert sufficient gripping action against the stud and article to which it is applied, to prevent removal of the stud under the exertion of the force that is normally used in pulling against the knob or other article to which the stud is attached.

An object of the present invention is to make a fastener which can be economically manufactured on a production basis from sheet metal, which is adapted to be inserted into an aperture in a support, which has provision for limiting the inward movement of the fastener, and which is expandible against the wall of the aperture for effecting a fastening engagement therewith consequent upon the introduction of a stud into the fastener. A further object is to so make the fastening device that the single step of moving the stud into the fastener is adequate not only to hold the stud in the desired position within the fastener, but also to hold the fastener securely in place against the wall of the opening into which it is inserted.

Referring now to the drawing, Fig. 1 is a section partly in elevation of a knob assembly embodying my invention; Fig. 2 is a sectional view showing the fastening device inserted in place within an aperture in a support before the knob is applied thereto; Fig. 3 is a perspective view of the fastener per se; Fig. 4 is a perspective view showing the article of Fig. 3 turned through 180°; Figs. 5, 6, and 7 are diagrammatic views on a scale larger than that shown in Figs. 1 and 2, but illustrating the relative position of the fastener parts during various stages of the assembly operation.

In Figs. 1 and 2, I have shown a supporting surface 10 as having an aperture or pocket 11 therein which opens onto the face 12. The pocket 11 is adapted to receive a stud 13 which projects axially from a knob 14, as is shown in the assembled position of Fig. 1.

The fastening device per se, by means of which the stud may be locked against the article or support 10 comprises a one-piece sheet metal tubular clip which is in the form of a substantially cylindrical split ring 20 that is adapted to be extended into the aperture 11. The fastener has a shoulder, preferably in the form of a flange 21 which extends around the marginal portion at one end thereof for engaging the surface 12 and thereby limiting movement of the fastener into the aperture. The body of the fastener, although stated as being substantially cylindrical in shape, is preferably slightly tapered from end to end as is shown in Fig. 2 in the normal position, that is before the stud 13 is inserted thereinto. The body is thus expandible under the force exerted by the stud until it is firmly positioned in stud-retaining position on the support.

To facilitate a firm connection between the fastener and the support, I have shown the end of the body opposite the flange 21 as having a serration 25, preferably on the side opposite the longitudinal split 26, which divides the body into terminal fingers 27 and 28. Each finger has a lip 29 which may be formed by a concavo-convex annular groove 30 disposed adjacent the end of the body where the recess 25 is located, and such groove has the concave surface disposed adjacent the outer surface of the body, as is shown in the various figures.

Although the body is expandible under the influence of a stud that is inserted thereinto, nevertheless, the fingers 27 and 28 are also additionally expandible or movable outwardly with reference to each other under the force of the inserted stud, as a result of which the lips are forced into engagement with the wall of the pocket to a sufficient extent that the lips extend outwardly beyond the confines of the outer surface of the tubular body, and thereby pierce the wall of the pocket as is shown in Figs. 1 and 7, thus effecting a secure interlock between the fastener and article. The action is illustrated in Figs. 5, 6, and 7, wherein Fig. 5 shows the position of a lip before the stud is inserted into the fastener; Fig. 6 shows the position of the lip as the stud engages the convex part of the groove, and Fig. 7 shows the lip after it has pierced the wall of the groove under the influence of the stud which is moving in the direction shown by the arrows in Figs. 6 and 7. In Fig. 7, the stud has reached the innermost limit of its inward travel.

A fastening device embodying the present invention may be applied merely by being inserted into the aperture in a support as is shown in Fig. 2, until the flange 21 engages the surface of the support, and then the part having a stud 13 thereon is assembled merely by pushing the stud into the fastener. By employing a stud of sufficient length that the lower portion thereof will pass through the fastener, the body will be expanded until it is in firm engagement with the walls of the aperture and until the tips of the fingers 28 and 29 bite into the wall, as a result of which both the fastener and stud are securely locked to the support.

I claim:

A fastening device comprising a hollow, flexible sheet metal tubular body split from end to end and having a peripheral flange at one end thereof and having a slot disposed on the side opposite the split and extending inwardly from the end opposite the flange to a point short of the mid portion of said body, and said body having an annular groove at the end opposite the flange, the groove being concavo-convex with the concave portion on the outer surface of the body, and the groove terminating adjacent the end of the body.

GEORGE A. TINNERMAN.